United States Patent
Jung et al.

(10) Patent No.: US 8,325,287 B2
(45) Date of Patent: Dec. 4, 2012

(54) LIQUID CRYSTAL DISPLAY

(75) Inventors: Kwang-Chul Jung, Seongnam-si (KR);
Chong-Chul Chai, Seoul (KR);
Joon-Chul Goh, Hwaseong-si (KR);
Young-Soo Yoon, Anyang-si (KR)

(73) Assignee: Samsung Display Co., Ltd. (KR)

( * ) Notice: Subject to any disclaimer, the term of this patent is extended or adjusted under 35 U.S.C. 154(b) by 149 days.

(21) Appl. No.: 12/986,599

(22) Filed: Jan. 7, 2011

(65) Prior Publication Data

US 2011/0304789 A1 Dec. 15, 2011

(30) Foreign Application Priority Data

Jun. 15, 2010 (KR) .................. 10-2010-0056645

(51) Int. Cl.
*G02F 1/136* (2006.01)
(52) U.S. Cl. .......................................... 349/48
(58) Field of Classification Search ............. 349/48
See application file for complete search history.

(56) References Cited

U.S. PATENT DOCUMENTS

| | | |
|---|---|---|
| 2007/0118781 A1 | 5/2007 | Kim |
| 2008/0158455 A1 | 7/2008 | Yoo et al. |
| 2009/0027581 A1 | 1/2009 | You et al. |
| 2009/0135323 A1 | 5/2009 | Yang et al. |
| 2009/0160751 A1 | 6/2009 | Collins |
| 2009/0195719 A1 | 8/2009 | Kim et al. |
| 2009/0225018 A1 | 9/2009 | Kim |
| 2009/0268112 A1 | 10/2009 | Lu et al. |

FOREIGN PATENT DOCUMENTS

| | | |
|---|---|---|
| JP | 2007-133284 A | 5/2007 |
| JP | 2008-219413 A | 9/2008 |
| JP | 2009-157364 A | 7/2009 |
| KR | 1020080098882 A | 11/2008 |
| KR | 1020080101582 A | 11/2008 |
| KR | 1020080102798 A | 11/2008 |
| KR | 1020090069252 A | 6/2009 |

*Primary Examiner* — Phu Vu
(74) *Attorney, Agent, or Firm* — Cantor Colburn LLP

(57) ABSTRACT

A liquid crystal display includes a gate line, a data line crossing the gate line and insulated from the gate line, a common voltage line separated from the gate line and the data line, where the common voltage line transfers a predetermined voltage, a first switching element connected to the gate line and the data line, a second switching element connected to the gate line and the data line, a first liquid crystal capacitor connected to the first switching element, a second liquid crystal capacitor connected to the second switching element and at least two decompressing switching elements connected to the second switching element and the common voltage line.

22 Claims, 7 Drawing Sheets

LIQUID CRYSTAL DISPLAY

This application claims priority to Korean Patent Application No. 10-2010-0056645, filed on Jun. 15, 2010, and the benefits accruing therefrom under 35 U.S.C. §119, the content of which in its entirety is herein incorporated by reference.

BACKGROUND OF THE INVENTION (1) Field of the Invention

The general inventive concept relates to a liquid crystal display.

(2) Description of the Related Art

A liquid crystal display, which is one of the most widely used type of flat panel displays, generally includes two display plates on which field generating electrodes, such as a pixel electrode and a common electrode, are disposed and a liquid crystal layer interposed therebetween. The liquid crystal display typically generates electric field in the liquid crystal layer by applying voltage to the field generating electrodes, determines a direction of liquid crystal molecules of the liquid crystal layer and controls a polarization of incident light by the generated electric field to displaying images.

A vertically aligned mode liquid crystal display, in which a longitudinal axis of the liquid molecule is aligned to be vertical to an upper and lower display plate when an electric field is not generated in the liquid crystal layer, typically has a high contrast ratio and a wide reference-viewing angle.

In general, one pixel may be divided into a plurality of domains, corresponding to liquid crystal molecules whose alignment directions are different from one another, respectively, to increase the viewing angle in the vertically aligned mode liquid crystal display. A method of forming a cutout portions, e.g., a slit in the field generating electrode, may be used to divide the one pixel into the plurality of domains. Since the cutout portions determine a direction where the liquid crystal molecule is tilted, these cutout portions may be disposed to disperse the tilt direction of the liquid crystal molecule in various directions, and the reference-viewing angle of the liquid crystal display is thereby increased.

On the other hand, the vertically aligned mode liquid crystal display may have side visibility lower than front visibility thereof. Accordingly, a method that divides one pixel into two subpixels and makes the voltage of two subpixels different may be used to improve side visibility of the vertically aligned mode liquid crystal display.

SUMMARY OF THE INVENTION

In one exemplary embodiment, a liquid crystal display includes a gate line; a data line crossing the gate line and insulated from the gate line, a common voltage line separated from the gate line and the data line, where the common voltage line transfers a predetermined voltage, a first switching element connected to the gate line and the data line, a second switching element connected to the gate line and the data line, a first liquid crystal capacitor connected to the first switching element, a second liquid crystal capacitor connected to the second switching element and at least two decompressing switching elements connected to the second switching element and the common voltage line.

In one exemplary embodiment, the at least two decompressing switching elements may be connected to one another in series.

In one exemplary embodiment, the control terminals of at each of the least two decompressing switching elements may be connected to the common voltage line.

In one exemplary embodiment, the liquid crystal display may further include at least one decompressing capacitor connected to the common voltage line and at least one switching element of the at least two decompressing switching elements.

In one exemplary embodiment, each of the at least one decompressing capacitors may include a first terminal and a second terminal, where the first terminal may correspond to an output terminal of the at least one decompressing switching element connected thereto and the second terminal may correspond to a portion of the common voltage line as two terminals.

In one exemplary embodiment, the liquid crystal display may further include a controller which controls a data voltage received from the data line such that a polarity of the data voltage with respect to the predetermined voltage of the common voltage line is inverted every frame.

In one exemplary embodiment, a control terminal of the first switching element and a control terminal of the second switching element may be connected to the gate line, an input terminal of the first switching element and an input terminal of the second switching element may be connected to the data line, an output terminal of the first switching element may be connected to the first liquid crystal capacitor and an output terminal of the second switching element may be connected to the second liquid crystal capacitor an input terminal of one decompressing switching element of the at least two decompressing switching elements.

In one exemplary embodiment, the at least two decompressing switching elements may include a first decompressing switching element and a second decompressing switching element, an input terminal of the first decompressing switching element may be connected to the output terminal of the second switching element and an output terminal of the first decompressing switching element and an input terminal of the second decompressing switching element may be connected to each other.

In one alternative exemplary embodiment, a liquid crystal display includes a first substrate, a second substrate disposed opposite to the first substrate, a gate line disposed on the first substrate, a data line disposed on the first substrate, a common voltage line disposed on the first substrate, a first switching element connected to the gate line and the data line, a second switching element connected to the gate line and the data line, a first subpixel electrode connected to the first switching element, a second subpixel electrode connected to the second switching element, and at least two decompressing switching elements connected to the second switching element and the common voltage line.

In one alternative exemplary embodiment, the at least two decompressing switching elements may be connected to one another in series.

In one alternative exemplary embodiment, a control terminal of each of the at least two decompressing switching elements may be connected to the common voltage line.

In one alternative exemplary embodiment, the liquid crystal display may further include at least one decompressing capacitor connected to the at least two decompressing switching elements and the common voltage line, respectively.

In one alternative exemplary embodiment, the liquid crystal display may further include an opposed electrode disposed on the second substrate, where the opposed electrode receives a predetermined voltage from the common voltage line.

DETAILED DESCRIPTION OF THE INVENTION

Figure 1:
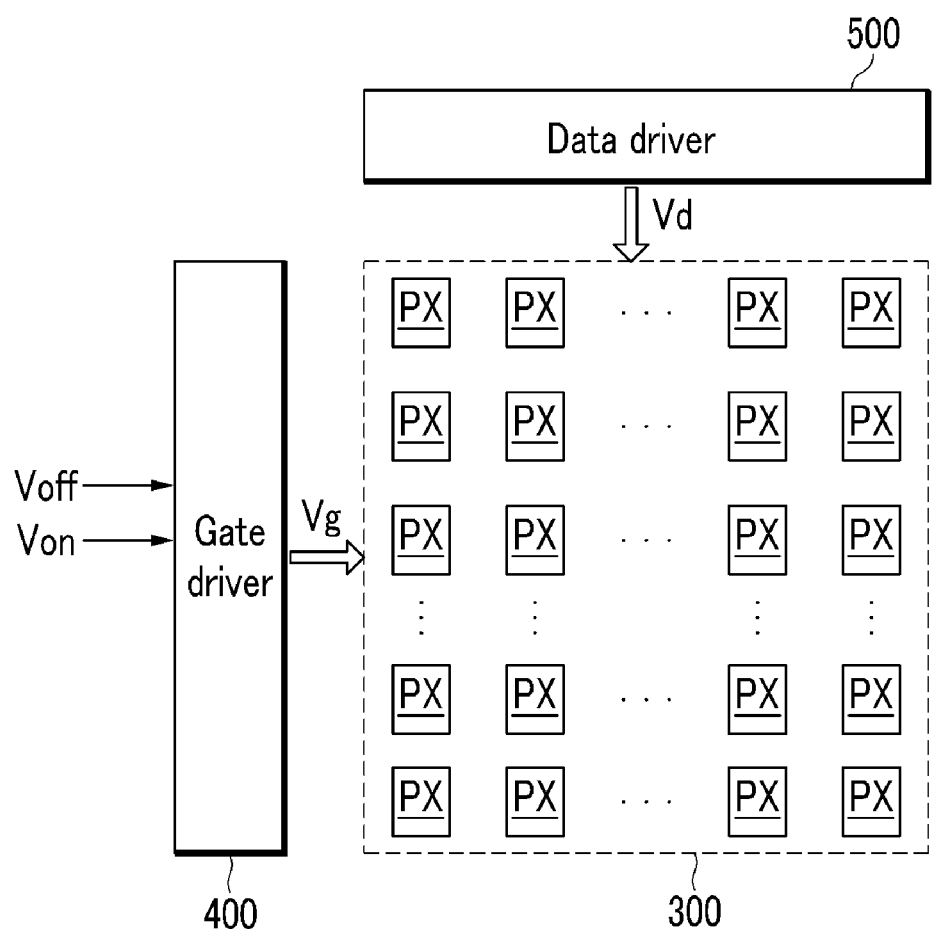
FIG. 1 is a block diagram of an exemplary embodiment of a liquid crystal display ("LCD") according to the present invention.

The invention now will be described more fully hereinafter with reference to the accompanying drawings, in which embodiments of the invention are shown. This invention may, however, be embodied in many different forms and should not be construed as being limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on" another element, it can be directly on another element or intervening elements may be present. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross-section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the actual shape of a region of a device and are not intended to limit the scope of the present invention.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Now, an exemplary embodiment of a liquid crystal display will be described with reference to FIGS. 1 and 2.

Figure 2:
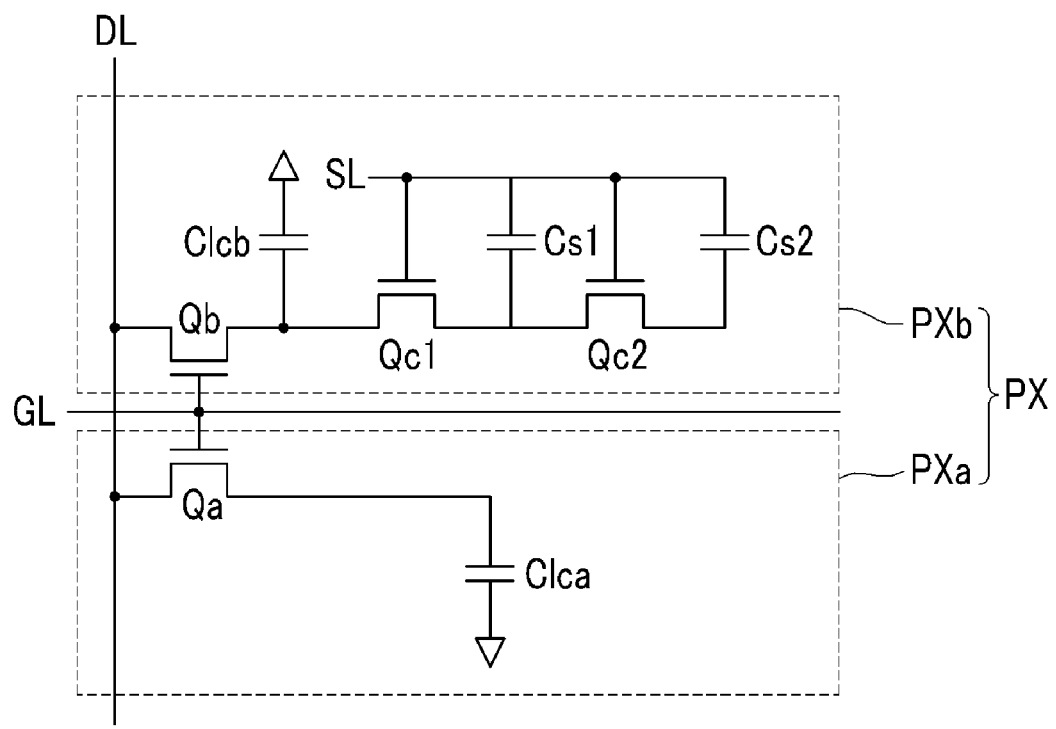
FIG. 2 is an equivalent circuit diagram of one pixel of an exemplary embodiment of the liquid crystal display according to the present invention.

FIG. 1 is a block diagram of an exemplary embodiment of a liquid crystal display according to the present invention, and FIG. 2 is an equivalent circuit diagram of one pixel of an exemplary embodiment of the liquid crystal display.

Referring to FIG. 1, an exemplary embodiment of the liquid crystal display includes a liquid crystal panel assembly 300, a gate driver 400 and a data driver 500.

As shown in FIGS. 1 and 2, the liquid crystal panel assembly 300 includes a plurality of signal lines, e.g., a gate line GL, a data line DL and a common voltage line SL, and a plurality of pixels PX connected to the signal lines GL, DL and SL and arranged substantially in a matrix form.

The gate line GL transfer a gate signal (hereinafter, also referred to as a "scanning signal"), the data line DL transfers a data voltage and a common voltage line SL transfers a predetermined voltage, e.g., a common voltage. The gate line GL and the common voltage line SL may extend substantially in a row direction and may be substantially parallel to each other. The data line DL may extend substantially in a column direction and may be substantially parallel to one another.

As shown in FIG. 2, each pixel PX of the plurality of pixels includes a first subpixel PXa and a second subpixel PXb. The first subpixel PXa includes a first liquid crystal capacitor Clca and a first switching element Qa, the second subpixel PXb includes a second liquid crystal capacitor Clcb, a second switching element Qb, a first decompressing switching element Qc1, a first decompressing capacitor Cs1, a second decompressing switching element Qc2 and a second decompressing capacitor Cs2.

Each of the first switching element Qa, the second switching element Qb, the first decompressing switching element Qc1, and the second decompressing switching element Qc2 may be a three-terminal element, e.g., a thin film transistor.

A control terminal of the first switching element Qa is connected to the gate line GL, an input terminal of the first switching element Qa is connected to the data line DL, and an output terminal of the first switching element Qa is connected to the first liquid crystal capacitor Clca. A control terminal of the second switching element Qb is connected to the gate line GL, an input terminal of the second switching element Qb is connected to the data line DL, and an output terminal of the second switching element Qb is connected to the second liquid crystal capacitor Clcb.

In an exemplary embodiment, each of the first liquid crystal capacitor Clca and the second liquid crystal capacitor Clcb may be formed by two electrodes corresponding two terminals thereof, respectively, for example, the subpixel (not shown) of a lower panel (not shown) and the opposed electrode (not shown) of an upper panel (not shown), and the liquid crystal layer (not shown) disposed between the two electrodes and which serves as a dielectric material.

An input terminal of the first decompressing switching element Qc1 is connected to the second switching element Qb and the second liquid crystal capacitor Clcb, an output terminal of the first decompressing switching element Qc1 is connected to the first decompressing capacitor Cs1, and an control terminal of the first decompressing switching element Qc1 is connected to the common voltage line SL.

In an exemplary embodiment, a first terminal of each of decompressing capacitors, e.g., the first decompressing capacitor Cs1 and the second decompressing capacitor Cs2, may correspond to an output terminal of a decompressing switching element connected thereto and a second terminal of the decompressing capacitors, e.g., the first decompressing capacitor Cs1 and the second decompressing capacitor Cs2, may correspond to a portion of the common voltage line connected thereto.

Two terminals, e.g., a first terminal and a second terminal, of the first decompressing capacitor Cs1 are connected to the output terminal of the first decompressing switching element Qc1 and the common voltage line SL, respectively. As described above, the first decompressing capacitor Cs1 may be formed by overlapping the output terminal of the first decompressing switching element Qc1 and a portion of the common voltage lines SL along with an insulator disposed therebetween.

An input terminal of the second decompressing switching element Qc2 is connected to the output terminal of the first decompressing switching element Qc1, an output terminal the second decompressing switching element Qc2 is connected to the second decompressing capacitor Cs2, a control terminal the second decompressing switching element Qc2 is connected to the common voltage line SL.

Two terminals, e.g., a first terminal and a second terminal, of the second decompressing capacitor Cs2 are connected to an output terminal of the second decompressing switching element Qc2 and the common voltage line SL, respectively. As described above, the second decompressing capacitor Cs2 may be formed by overlapping the output terminal of the second decompressing switching element Qc2 and a portion of the common voltage lines SL along with an insulator disposed therebetween.

In an exemplary embodiment, as shown in FIG. 2, two decompressing switching elements, e.g., the first and second decompressing switching elements Qc1 and Qc2, are connected in series, but decompressing switching elements that may be included in each pixel PX is not limited to the two decompressing switching elements, e.g., the first and second decompressing switching elements Qc1 and Qc2. In an alternative exemplary embodiment, the first and second decompressing switching elements Qc1 and Qc2 and at least one additional decompressing switching element may be connected in series. resulting an alternative exemplary embodiment, at least one additional decompressing capacitor other than the first and second decompressing capacitors Cs1 and Cs2 may be included and the at least one additional decompressing capacitor may be connected to an output terminal of the at least one additional decompressing switching element and the common voltage line SL.

In an alternative exemplary embodiment, a sustain capacitor (not shown) which performs an auxiliary function of the first and second liquid crystal capacitors Clca and Clcb may be further included in each pixel PX.

The pixel PX may display one of primary colors (spatial division) or each pixel PX may alternately display the primary colors over time (temporal division) to implement color display, such that desired colors are recognized by a viewer through the spatial and temporal sum of the primary colors. The primary colors may include three primary colors of red, green and blue, for example, but not being limited thereto. In an exemplary embodiment, each pixel PX may include a color filter (not shown) corresponding to one of the primary colors for the spatial division.

In an exemplary embodiment, the liquid crystal panel assembly 300 may include at least one polarizer (not shown).

Referring back to FIGS. 1 and 2, the data driver 500 is connected to the data line DL of the liquid crystal panel assembly 300 and outputs the data voltage Vd to the data line DL.

The gate driver 400 is connected to the gate line GL of the liquid crystal panel assembly 300 and outputs the gate signal Vg to the gate line GL. In an exemplary embodiment, the gate signal Vg includes a gate-on voltage Von that turns on the first and second switching elements Qa and Qb and a gate-off voltage Voff that turns off the first and second switching elements Qa and Qb.

A pixel of the liquid crystal display shown in FIGS. 1 and 2 will be described in greater detail with reference to FIGS. 3 and 4.

Figure 3:
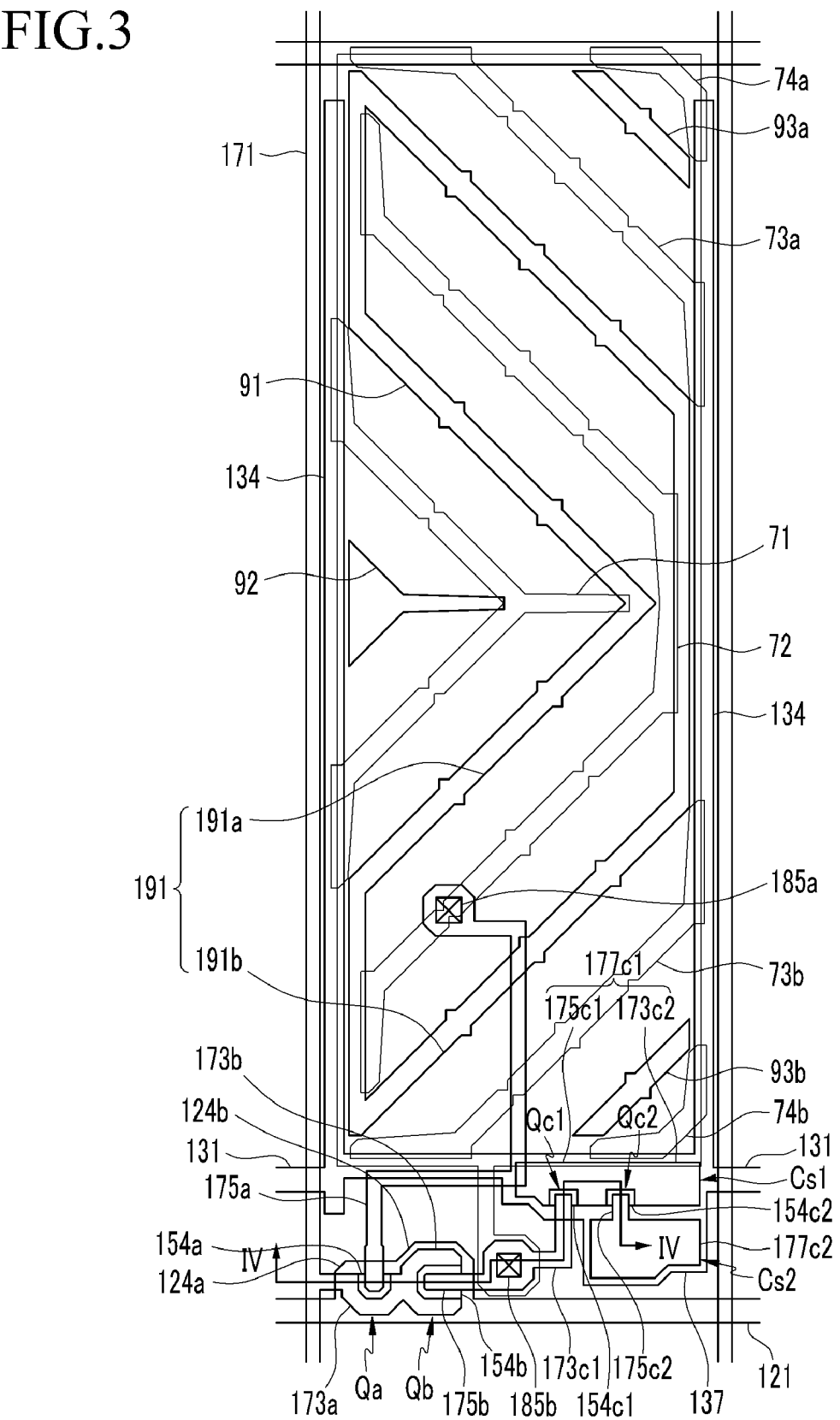
FIG. 3 is a top plan view of one pixel of an exemplary embodiment of the liquid crystal display according to the present invention.
Figure 4:
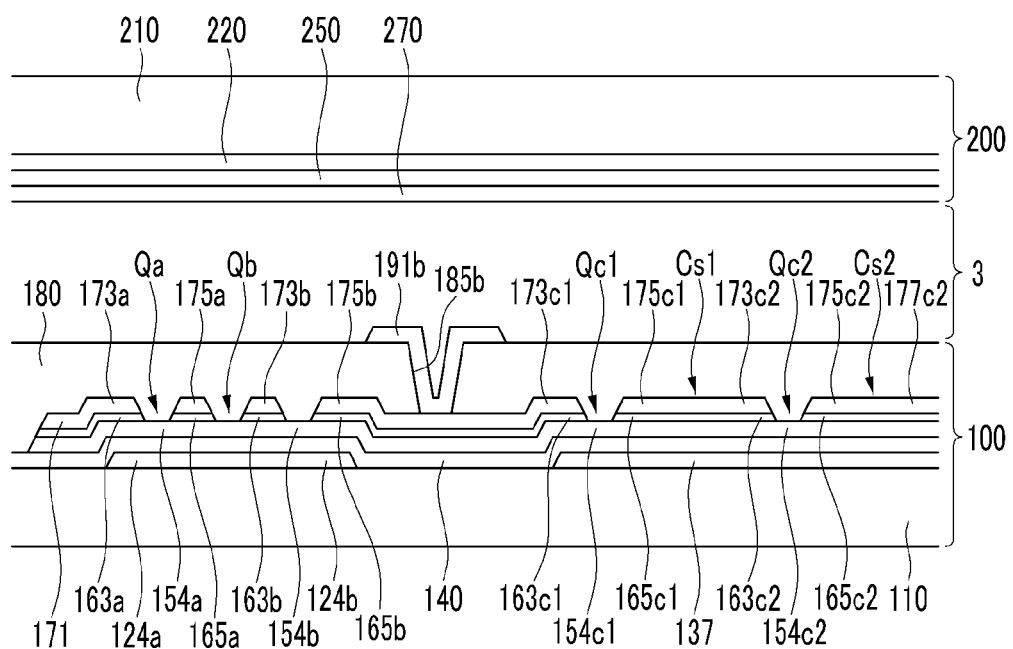
FIG. 4 is a partial cross-sectional view taken along line IV-IV of FIG. 3.

FIG. 3 is a top plan view of one pixel of an exemplary embodiment of the liquid crystal display, and FIG. 4 is a partial cross-sectional view taken along line IV-IV of FIG. 3.

In an exemplary embodiment, the liquid crystal display includes a lower panel 100, an upper panel 200 disposed opposite to the lower panel 100 and a liquid crystal layer 3 interposed between the lower and upper panels 100 and 200.

Now, the lower panel 100 will be described in detail.

The lower panel 100 includes an insulation substrate 110. A plurality of gate conductors, including a gate line 121 and a common voltage line 131, is disposed on the insulation substrate 110 of the lower panel.

The gate line 121 extends substantially in a horizontal direction and transfers the gate signal. The gate line 121 includes a first gate electrode 124a and a second gate electrode 124b that are expanded upwardly therefrom. The first gate electrode 124a and the second gate electrode 124b may be connected to each other.

The common voltage line 131 extends substantially in the horizontal direction and transfers a predetermined voltage, e.g., a common voltage. The common voltage line 131 includes a sustain electrode 137 expanded downwardly therefrom and a pair of vertical portions 134 that extend upwardly and substantially perpendicularly to the gate line 121.

A gate insulating layer 140 is disposed on the gate conductor.

A plurality of semiconductor stripes, (not shown) including a semiconductor material such as amorphous silicon or crystalline silicon, for example, is disposed on the gate insulating layer 140. The semiconductor stripe extends substantially in a vertical direction and includes first and second semiconductors 154a and 154b that extend to face the first and second gate electrodes 124a and 124b, respectively, and are connected to each other, and a third semiconductor 154c1 and a fourth semiconductor 154c2 that extend from the second semiconductor 154b and are disposed on the sustain electrode 137.

A first pair of ohmic contacts 163a and 165a is disposed on the first semiconductor 154a, and a second pair of ohmic contacts 163b and 165b is disposed on the second semiconductor 154b. A third pair of ohmic contacts 163c1 and 165c1 are disposed on the third semiconductor 154c1 and a fourth pair of ohmic contacts 163c2 and 165c2 are disposed on the fourth semiconductor 154c2. One ohmic contact 163a of the first pair of ohmic contacts 163a and 165a may be connected to the ohmic contact stripe (not shown) disposed on the semiconductor stripe, the other ohmic contact 165a of the first pair of ohmic contacts 163a and 165a and one ohmic contact 163b of the second pair of ohmic contacts 163b and 165b may be connected to each other, the other ohmic contact 165b of the second pair of ohmic contacts 163b and 165b and one ohmic contacts 163c1 of the third pair of ohmic contacts 163c1 and 165c1 may be connected to each other, the other ohmic contact 165c1 of the third pair of ohmic contacts 163c1 and 165c1 and one ohmic contact 163c2 of the fourth pair of ohmic contacts 163c2 and 165c2 may also be connected to each other. Ohmic contacts including the first, second, third and fourth pairs of ohmic contacts 163a, 165a, 163b, 165b, 163c1, 163c2, 165c1 and 165c2 may include a material such as n+ hydrogenated amorphous silicon, e.g., doped with n-type impurity, e.g., phosphorus at high concentration or silicide.

A data conductors including a data line 171, a first drain electrode 175a, a second drain electrode 175b, a third drain electrodes 175c1 and a fourth drain electrode 175c2 is disposed on the ohmic contacts 163a, 165a, 163b, 165b, 163c1, 163c2, 165c1, and 165c2 and the gate insulating layer 140.

The data line 171 transfers a data signal and extends substantially in the vertical direction and crossing the gate line 121 and the common voltage line 131. The data line 171 includes a first source electrode 173a and a second source electrode 173b that extend toward the first gate electrode 124a and the second gate electrode 124b, and the first source electrode 173a and the second source electrode 173b may be connected to each other.

Each of the first drain electrode 175a, the second drain electrode 175b and the fourth drain electrode 175c2 includes a bar type end and a wider end. At least a portion of the bar type ends of the first drain electrode 175a and the second drain electrode 175b are surrounded by the first source electrode 173a and the second source electrode 173b. The wider end of the second drain electrode 175b extends and forms the third source electrode 173c1 having a bar type shape. The third source electrode 173c1 faces the third drain electrode 175c1. A portion of the third drain electrode 175c1 forms the fourth source electrode 173c2. The third drain electrode 175c1 and the fourth source electrode 173c2 are also referred to as an extending portion 177c1. The fourth source electrode 173c2 faces an end of the fourth drain electrode 175c2 having a bar type shape. The wider end 177c2 of the fourth drain electrode 175c2 overlaps the sustain electrode 137 of the common voltage line 131.

The first/second gate electrodes 124a/124b, the first/second source electrodes 173a/173b and the first/second drain electrodes 175a/175b form the first/second switching elements Qa/Qb, e.g., first/second thin film transistors ("TFT") Qa/Qb, together with the first/second semiconductors 154a/154b. The sustain electrode 137, the third/fourth source electrodes 173c1/173c2 and the third/fourth drain electrodes 175c1/175c2 form the first/second decompressing switching elements Qc1/Qc2, e.g., third/fourth thin film transistors Qc1/Qc2, together with the third/fourth semiconductors 154c1/154c2. a channel of each of the thin film transistor, e.g., the first/second/third/fourth thin film transistors Qa/Qb/Qc1/Qc2, is formed in a corresponding semiconductor, e.g., the first/second/third/fourth semiconductors 154a/154b/154c1/154c2, between a corresponding source electrode 173a/173b/173c1/173c2 and a corresponding drain electrode, e.g., the first/second/third/fourth drain electrodes 175a/175b/175c1/175c2.

The semiconductor stripe including the first, second, third and fourth semiconductors 154a, 154b, 154c1 and 154c2 may have a plane shape substantially same as a shape of the data conductor and the ohmic contacts 163a, 165a, 163b, 165b, 163c1, 163c2, 165c1 and 165c2 that are disposed below the data conductor, except for a channel region between the first, second, third and fourth source electrodes 173a, 173b, 173c1 and 173c2 and the first, second, third and fourth drain electrodes 175a, 175b, 175c1 and 175c2.

As shown in FIG. 4, the extension portion 177c1 overlaps the sustain electrode 137 and the gate insulating layer 140 is disposed therebetween to form the first decompressing capacitor Cs1. The fourth drain electrode 175c2 overlaps the sustain electrode 137 and the gate insulating layer 140 is disposed therebetween to form the second decompressing capacitor Cs2.

In an exemplary embodiment, a passivation layer 180 including an insulating material such as an inorganic insulating material, e.g., silicon nitride or silicon oxide, or an organic insulating material, is disposed on the data conductor and opened portions of first, second, third and fourth semiconductors 154a, 154b, 154c1 and 154c2. In an alternative exemplary embodiment, the passivation layer 180 may have a double layer structure, where each of the double layers includes at least one of the organic insulating material and the inorganic insulating material. The passivation layer 180 may include a first contact hole 185a formed thereon and which exposes the wider end of the first drain electrode 175a and a second contact hole 185b which exposes the wider end of the second drain electrode 175b.

A plurality of pixel electrodes 191 is disposed on the passivation layer 180. Each of the plurality of pixel electrodes 191 may include a transparent conductive material, such as indium tin oxide ("ITO") or indium zinc oxide ("IZO"), or a reflective metal, such as aluminum, silver, chromium or an alloy thereof. A pixel electrode 191 of the plurality of pixel electrodes includes a first subpixel electrode 191a and a second subpixel electrode 191b and an entire shape of the pixel electrode 191 may be quadrangle. The first subpixel electrode 191a is surrounded by the second subpixel electrode 191b, with a gap 91 therebetween.

The first subpixel electrode 191a includes two oblique portions disposed in a lower portion and an upper portion thereof, respectively, and which extend obliquely with respect to the gate line 121.

The second subpixel electrode 191b includes a triangle portion disposed between the two oblique portions of the first subpixel electrode 191a and including a cutout portion 92 having a funnel shape, an upper portion disposed above the upper portion of the two oblique portions of the first subpixel electrode 191a and including an upper cutout portion and a lower portion disposed below lower portions of the two oblique portions of the first subpixel electrode 191a and including a lower cut portion 93b. The cutout portion 92 includes two oblique sides that extend in a direction substantially parallel to two oblique sides of the gap 91, respectively, and two horizontal sides that are connected to the two oblique sides of the gap 91 and extending in the horizontal direction. The upper and lower cutout portions 93a and 93b, which are substantially parallel to each other, are also formed along a direction substantially parallel to the two oblique sides of the gap 91 corresponding thereto.

The two oblique sides of the gap 91, the two oblique sides of the cutout portion 92 and the upper and lower cutout portions 93a and 93b may form an angle of about 45° or about 135° with respect to the gate line 121.

An area of the second subpixel electrode 191b may be greater than an area of the first subpixel electrode 191a.

The first subpixel electrode 191a receives the data voltage from the first drain electrode 175a through the first contact hole 185a, and the second subpixel electrode 191b receives the data voltage from the second drain electrode 175b through the second contact hole 185b. In an exemplary embodiment, data voltages that the first subpixel electrode 191a and the second subpixel electrode 191b receive from the first and second switching elements Qa and Qb, respectively, may be identical to each other.

An alignment layer (not shown) may be disposed on the pixel electrode 191.

Now, the upper panel 200 will be described in detail.

The upper panel 200 includes an insulation substrate 210. A light blocking member 220 may be disposed on the insulation substrate 210 of the upper panel 200. The light blocking member 220 prevents light leakage between the pixel electrodes 191 and includes an opening (not shown) defining an opening region facing the pixel electrode 191.

A plurality of color filters (not shown) are disposed on the substrate 210 and the light blocking member 220. Substantial portion of each of the plurality of color filters may be disposed in a region surrounded by the light blocking member 220 and may extend along a pixel electrode 191 column. Each of the plurality of color filters may correspond to one of the primary colors such as three primary colors of red, green and blue, for example.

At least one of the light blocking member 220 and the color filter may be disposed on the lower panel 100.

An overcoat 250 is disposed on the color filter and the light blocking member 220. In an alternative exemplary embodiment, the overcoat 250 may be omitted.

An opposed electrode 270 disposed opposite to the pixel electrode 191 is disposed on the overcoat 250 and receives the predetermined voltage from the common voltage line, e.g., the common voltage. The opposed electrode 270 may be formed of a passing strip to face the plurality of pixel electrodes 191, for example, all the pixel electrodes 191 of the liquid crystal display. The opposed electrode 270 includes a plural pairs of cutout portions 71, 72, 73a, 73b, 74a and 74b, each pair of which has oblique portions substantially parallel to the oblique sides of the gap 91 of the pixel electrodes 191, the oblique sides of the cutout portion 92 and the cutout portions 93a and 93b, respectively. Each of the plurality of pairs of cutout portions 71, 72, 73a, 73b, 74a and 74b further includes a longitudinal portion that extends in the vertical direction or in a horizontal direction from an end of the oblique portion thereof and one cutout portion 71 of the plurality of pairs of cutout portions 71, 72, 73a, 73b, 74a and 74b further includes a horizontal portion that extends in the horizontal direction from a position where two oblique portions of the one cutout portion 71 intersect with each other.

An alignment layer (not shown) may be disposed on the opposed electrode 270.

In an alternative exemplary embodiment, two alignment layers, each of which may be a vertical alignment layer, may be disposed on the lower panel 100 and the upper panel 200.

The liquid crystal layer 3 between the lower panel 100 and the upper panel 200 includes liquid crystal molecules having negative dielectric anisotropy. The liquid crystal molecules may be aligned such that longitudinal axes thereof are disposed substantially vertically with respect to surfaces of the lower and upper display panels 100 and 200 when no electric field is generated in the liquid crystal layer 3.

The first subpixel electrode 191a of the lower panel 100 forms the first liquid crystal capacitor Clca together with the opposed electrode 270 of the upper panel 200 and the liquid crystal layer 3 disposed therebetween, and the second subpixel electrode 191b forms the second liquid crystal capacitor Clcb together with the opposed electrode 270 and the liquid crystal layer 3 disposed therebetween.

The first and second subpixel electrodes 191a and 191b, to which the data voltage is applied, generate electric field in the liquid crystal layer 3 together with the opposed electrode 270 of the upper panel 200, and a direction of alignment of the liquid crystal modules of the liquid crystal layer 3 disposed between subpixel electrodes 191, e.g., the first and second subpixel electrodes 191a and 191b, and the opposed electrode 270 is determined by a direction of the electric field. The direction of alignment of the liquid crystal molecules is determined primarily by a horizontal component generated by distorting main electric fields that are substantially vertical with respect to the surfaces of the lower and upper panels 100 and 200 at the sides of the gap 91 of the pixel electrode 191, the cutout portions 92, 93a, and 93b, and the cutout portions 71, 72, 73a, 73b, 74a and 74b of the opposed electrode 270. A horizontal component of the main electric fields is substantially vertical with respect to the sides of the gap 91 and the cutout portions 92, 93a, 93b, 71, 72, 73a, 73b, 74a and 74b, and the liquid crystal molecules are thereby inclined in a direction that is substantially vertical with respect to these sides. In an exemplary embodiment, inclined directions of the liquid crystal molecules may include about four directions, and when the direction where the above-mentioned liquid crystal molecule is inclined is various, the reference viewing angle of the liquid crystal display may become greater.

In an exemplary embodiment, a difference between each of the voltage of the first and second subpixel electrodes 191a and 191b and the voltage of the opposed electrode 270 corresponds to a charge voltage of each of the first and second liquid crystal capacitors Clca and Clcb, that is, a pixel voltage. The alignment or inclined degrees of the liquid crystal molecules may vary depending on a size of the pixel voltage, and a polarization degree of the light passing through the liquid crystal layer 3 is thereby changed. The change in the polarization degree corresponds to a change in transmittance of light by a polarizer, and the liquid crystal display thereby displays images.

In an exemplary embodiment, the data voltage of the second subpixel electrode 191b received through the second switching element Qb is changed by the first and second decompressing switching elements Qc1 and Qc2 and the first and second decompressing capacitors Cs1 and Cs2, such that the charging voltages of the second liquid crystal capacitor Clcb and the first liquid crystal capacitor Clca, which correspond to the inclined degrees of the liquid crystal molecules, are changed.

The operation of the liquid crystal display will be described in greater detail with reference to FIGS. 1 to 4 and FIG. 6.

Figure 6:
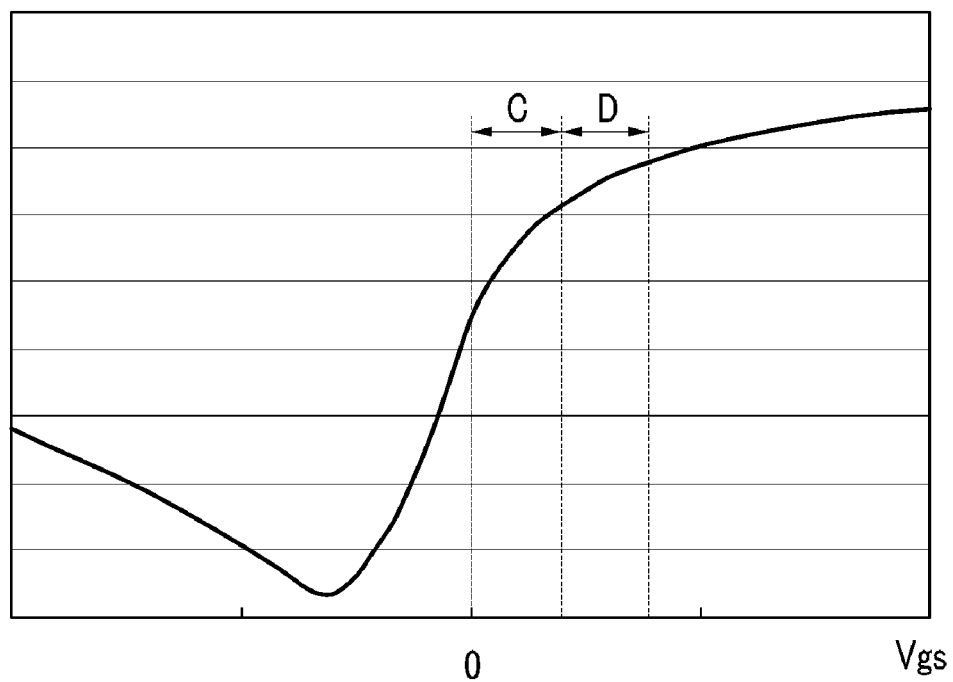
FIG. 6 is a graph showing a drain-source current versus a gate-source voltage of a thin film transistor of an exemplary embodiment of a liquid crystal display according to the present invention.

FIG. 6 is a graph showing a drain source current versus a gate-source voltage Vgs of a thin film transistor of an exemplary embodiment of a liquid crystal display.

Referring back to FIG. 1, the data driver 500 receives digital image signals from an external device, selects gray voltage corresponding to each digital image signal, and thereby converts the digital image signal into an analog data voltage Vd and then applies the analog data voltage Vd to a data line (DL) 171.

The gate driver 400 applies the gate-on voltage Von to the gate line (GL) 121 to turn-on the first and second switching elements Qa and Qb connected to the gate line (GL) 121. Then, the data voltage Vd applied to the data line (DL) 171 is transmitted to the first and second subpixel electrodes 191a and 191b of a pixel PX through the turned-on first and second switching elements Qa and Qb.

The process is repeated in a unit of a horizontal period (also referred to as "1H" and is substantially the same as one period of a horizontal synchronizing signal and a data enable signal), and the gate-on voltage Von is thereby sequentially applied to all gate lines (GL) 121 and the data voltage Vd is thereby sequentially applied to all pixels PX to display the images of one frame. When one frame is over, the next frame begins and a state of an inverse signal RVS applied to the data driver 500 is controlled such that the polarity of the data voltage Vd applied to each pixel PX is opposite to the polarity of the previous frame (frame inversion). In this case, a polarity of the data voltage transmitted through one data line is periodically changed based on the reverse signal RVS even in one frame (e.g., row inversion, dot inversion) or the polarity of the data voltage applied to each pixel row may be different (e.g., column inversion, dot inversion). A controller that controls the state of the inversion signal RVS may be disposed inside or outside the data driver 500.

Hereinafter, the data voltage Vd is referred to as a "positive data voltage" when the data voltage Vd is substantially equal to or greater than the voltage of the opposed electrode 270, and the data voltage Vd is referred to as a "negative data voltage" when the data voltage Vd is substantially equal to or less than the voltage of the opposed electrode 270.

Now, a case where the positive data voltage Vd corresponding to a high gray (e.g. intermediate gray or higher) is applied to the data line (DL) 171 will be described in detail.

When a negative voltage in a previous frame is applied to the output terminal of the first decompressing switching element Qc1 and the output terminal of the second decompressing switching element Qc2 and the common voltage is continuously applied to the control terminal of the first and second decompressing switching elements Qc1 and Qc2, a voltage difference between the output terminal and the control terminal of the first and second decompressing switching elements Qc1 and Qc2, that is, the gate-source voltage Vgs, corresponds to 'C' region or 'D' region of FIG. 6.

While the positive data voltage Vd is charged in the input terminal of the first decompressing switching element Qc1 through the second switching element Qb, current flows from the input terminal of the first decompressing switching element Qc1 to the output terminal thereof and a voltage of the output terminal increases. Therefore, the gate-source voltage Vgs gradually decreases, such that the first decompressing switching element Qc1 corresponds to the 'C' region or a region biased to a left portion of the 'C' region of FIG. 6 and current from the input terminal to the output terminal, that is, a drain-source current Ids is substantially gradually decreased. In particular, as the positive data voltage Vd corresponds to the high gray, the voltage of the output terminal of the first decompressing switching element Qc1 is substantially increased during a charging time of the data voltage Vd. The second decompressing switching element Qc2 is operated substantially similarly to the first decompressing switching element Qc1, such that a voltage of the output terminal of the second decompressing switching element Qc2 also increases.

After the positive data voltage Vd is charged in the input terminal of the first decompressing switching element Qc1 through the second switching element Qb, until current does not flow to the first decompressing switching element Qc1 and the second decompressing switching element Qc2, a voltage of the input terminal of the first decompressing switching element Qc1 decreases and the voltages of the output terminal of the first and second decompressing switching elements Qc1 and Qc2 increases. In an exemplary embodiment, the voltage of the input terminal of the first decompressing switching element Qc1, that is, the voltage of the second subpixel electrode 191b falls decreases such that the voltage of the input terminal of the first decompressing switching element Qc1 is substantially equal to the voltage of the output terminal of the second decompressing switching element Qc2. When the data voltage Vd is a high gray voltage, the voltage of the output terminals of the first and second decompressing switching elements Qc1 and Qc2 substantially increase during the charging time of the data voltage Vd, such that an amount of voltage drop at the second subpixel electrode 191b may be less than a voltage drop of a low gray voltage after the data voltage Vd is charged.

The change in voltage of the second subpixel electrode 191b during the charging time of the data voltage Vd or after the charging is completed may vary according to a capacity of the second liquid crystal capacitor Clcb and the first and second decompressing capacitors Cs1 and Cs2, the voltage value of the common voltage and characteristics of the first and second decompressing switching elements Qc1 and Qc2.

In an exemplary embodiment, a case where the positive data voltage Vd corresponding to a low gray (e.g. intermediate gray or lower) is applied to the data line (DL) 171 is substantially the same as the case described above where the positive data voltage Vd corresponding to the high gray is applied. However, as compared to the case of the high gray, current flowing to the first and second decompressing switching elements Qc1 and Qc2 is less during the charging time of the data voltage Vd and the rising value of the voltage of the output terminals of the first and second decompressing switching elements Qc1 and Qc2 may be less. Therefore, after the charging of the data voltage Vd completes, the amount of voltage drop of the input terminal of the first decompressing switching element Qc1, that is, the second subpixel electrode 191b may be greater as compared to the case of the high gray. Therefore, the voltage difference between the first and second subpixel electrodes 191a and 191b in the case where the data voltage Vd is the low gray voltage becomes greater, as compared to the voltage difference between the first and second subpixel electrodes 191a and 191b in the case where the data voltage Vd is the high gray voltage.

Next, the negative data voltage Vd corresponding to the high gray (e.g. intermediate gray or higher) is applied to the data line (DL) 171 will be described in detail.

The output terminal of the first decompressing switching element Qc1 and the output terminal of the second decompressing switching element Qc2 receive the positive voltage in a previous frame and the control terminals of the first and second decompressing switching elements Qc1 and Qc2 continuously receive the common voltage, such that the voltage difference between the input terminal and the control terminal of the first and second decompressing switching elements Qc1 and Qc2, that is, the gate-source voltage Vgs, substantially corresponds to the 'D' region of FIG. 6.

While the negative data voltage Vd of the high gray is charged in the input terminal of the first depressing switching element Qc1 through the second switching element Qb, current flows from the output terminal of the first decompressing switching element Qc1 to the input terminal thereof, such that the voltage of the output terminal thereof decreases. However, the gate-source voltage Vgs is maintained as it is, such that the first decompressing switching element Qc1 is still operated in the 'D' region of FIG. 6. In particular, when the negative data voltage Vd corresponds to the high gray, the voltage of the output terminal of the first decompressing switching element Qc1 substantially decreases during the charging time of the data voltage Vd. The second decompressing switching element Qc2 is similarly operated as the first decompressing switching element Qc1, such that the voltage of the output terminal of the second decompressing switching element Qc2 decreases.

After the negative data voltage Vd of the high gray is charged in the input terminal of the first decompressing switching element Qc1 through the second switching element Qb, the voltage of the input terminal of the first decompressing switching element Qc1 increases until current does not flow to the first decompressing switching element Qc1 and the second decompressing switching element Qc2 and the voltage of the output terminal of the first and second decompressing switching elements Qc1 and Qc2 continuously falls. In an exemplary embodiment, the voltage of the input terminal of the first decompressing switching element Qc1, that is, the voltage of the second subpixel electrode 191b increases such that the voltage of the input voltage of the first decompressing switching element Qc1 is substantially equal to the voltage of the output voltage of the second decompressing switching element Qc2. When the data voltage Vd is the high gray voltage, the voltage of the output terminals of the first and second decompressing switching elements Qc1 and Qc2 substantially decreases during the charging time of the data voltage Vd, such that an amount of a voltage rise in the second subpixel electrode 191b after the charging of the data voltage Vd is completed may be less as compared to when the data voltage is the low gray voltage.

While the data voltage Vd is charged or after the charging is completed, the change in voltage of the second subpixel electrode 191b may vary according to the capacity of the second liquid crystal capacitor Clcb and the first and second decompressing capacitors Cs1 and Cs2, the voltage value of the common voltage and the characteristics of the first and second decompressing switching elements Qc1 and Qc2.

Next, the case where the negative data voltage Vd corresponding to the low gray (e.g. intermediate gray or less) is applied to the data line (DL) 171 is substantially the same as the case described above where the negative data voltage Vd of the high gray is applied. However, as compared to the case of the high gray, current flowing to the first and second decompressing switching elements Qc1 and Qc2 is less during the charging time of the data voltage Vd and the amount of the voltage drop of the output terminals of the first and second decompressing switching element Qc1 and Qc2 may be less. Therefore, after the charging of the data voltage Vd completes, the amount of the voltage rise of the input terminal of the first decompressing switching element Qc1, that is, the second subpixel electrode 191b may be greater as compared to the voltage rise of the input terminal of the first decompressing switching element Qc1 in the case of the high gray. Therefore, the voltage difference between the first and second subpixel electrodes 191a and 191b in the case where the data voltage Vd is the low gray voltage becomes greater, as compared to the voltage difference between the first and second subpixel electrodes 191a and 191b in the case where the data voltage Vd is the high gray voltage.

Regardless of the polarity of the data voltage Vd, the voltage difference between the second subpixel electrode 191b and opposed electrode 270 may become less than the voltage difference between the first subpixel electrode 191a and opposed electrode 270, such that the charging voltage of the second liquid crystal capacitor Clcb is less than the charging voltage of the first liquid crystal capacitor Clca. Accordingly, the charging voltage of the second liquid crystal capacitor Clcb is lower than the charging voltage of the first liquid crystal capacitor Clca, such that the inclined angels of the liquid crystal molecules of the first subpixel PXa and the second subpixel PXb are different from each other, and the luminances of two subpixels, e.g., the first subpixel PXa and the second subpixel PX b, are thereby different from each other. When the luminance of the first and second subpixels PXa and PXb is different from each other, the visibility without reducing the aperture ratio is substantially improved. In particular, the voltage difference between the first and second subpixel electrodes 191a and 191b in the case of the low gray is large as compared to the voltage difference between the first and second subpixel electrodes 191a and 191b in the case of the high gray, and the visibility is thereby substantially improved.

In an exemplary embodiment, after the charging of the data voltage Vd is completed, the voltage of the second subpixel electrode 191b may be continuously changed for substantial portion of one frame, and the stress may be substantial when only the first decompressing switching element Qc1 is disposed in the second subpixel PXb. In an exemplary embodiment, the first decompressing switching element Qc1 operates along with the second decompressing switching element Qc2, such that the stress is distributed to the first decompressing switching element Qc1 and the second decompressing switching element Qc2, and the change in threshold of the first and second decompressing switching elements Qc1 and Qc2 is thereby effectively prevented.

In an exemplary embodiment, the second decompressing capacitor Cs2 is further included in addition to the first decompressing capacitor Cs1, and the size of the entire decompressing capacitors where the first decompressing capacitor Cs1 and the second decompressing capacitor Cs2 are included may be thereby substantially smaller than the size of the entire decompressing capacitor when only the first decompressing capacitor Cs1 is included.

Figure 7:
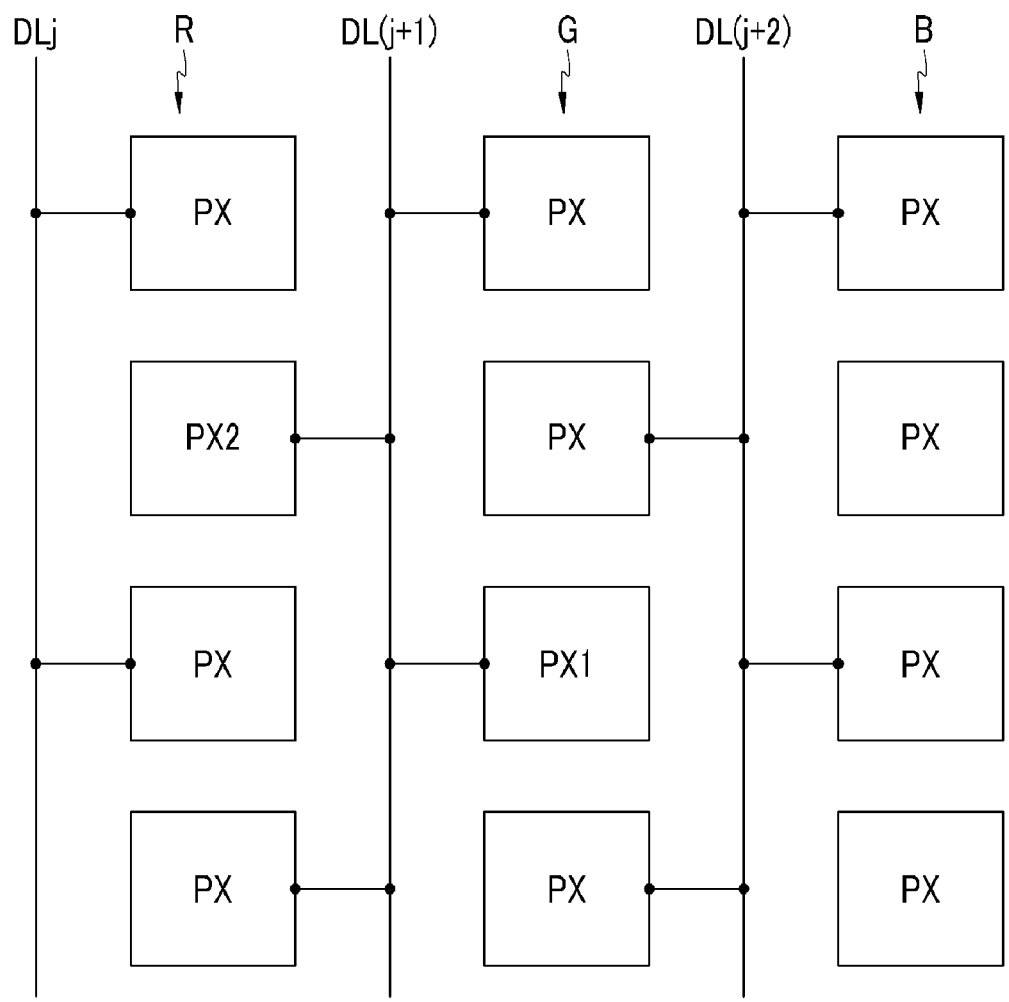
FIG. 7 is a block diagram showing a connection relationship between data lines and pixels of an exemplary embodiment of a liquid crystal display according to the present invention.

In an exemplary embodiment, in case where the pixel and the data line are disposed as shown in FIG. 7 to implement the dot inversion driving and in the case of the overlapping driving of previously charging the pixel PX to secure the charging rate, two or more decompressing switching elements may be included, and the degradation in visibility is thereby effectively prevented.

This will be described with reference to FIG. 7 and the above-mentioned FIGS. 1 to 4. The components in FIG. 7 have been labeled with the same reference characters as used above to describe the exemplary embodiments in FIGS. 1 and 2, and any repetitive detailed description thereof will hereinafter be omitted or simplified.

FIG. 7 is a block diagram showing a connection relationship between data lines and pixels PX of an exemplary embodiment of a liquid crystal display according to the present invention.

Referring to FIG. 7, a plurality of pixels PX is arranged substantially in a matrix form, and pixels PX disposed along one column may display one color of the primary colors, e.g., red R, green G and blue B. Each pixel PX may include the structure of FIG. 2.

In an exemplary embodiment, the data lines, e.g., a j-th data line DLj, a (j+1)-th data line DL(j+1) and a (j+2)-th data line DL(j+2), extend in a column direction and each data line is disposed between pixel columns and polarities of data voltages Vd applied to two neighboring data lines, respectively, e.g., a polarity of data voltage applied to the j-th data line DLj and a polarity of data voltage applied to the (j+1)-th data line DL(j+1), or the polarity of data voltage applied to the (j+1)-th data line DL(j+1) and a polarity of data voltage applied to the (j+2)-th data line DL(j+2), is opposite to each other.

In an exemplary embodiment, pixels PX in a pixel column are disposed between two neighboring data lines and the pixels in the pixel column are alternately connected to the two neighboring data lines, such that two neighboring pixels PX in a row direction or in a column direction receives data voltages Vd having different polarities, respectively, and a dot inversion is thereby implemented. In an exemplary embodiment, when two pixels PX disposed in different columns is connected to a same data line, for example, when a first pixel PX1 disposed in a green pixel column and a second pixel PX2 disposed in a red pixel column are connected to the (j+1)-th data lines DL(j+1), the gate on voltage Von is previously applied to a gate line (not shown) connected the first pixel PX1 during at least a portion of a time period during which the second pixel PX2 is charged with the data voltage Vd of the (j+1)-th data line DL(j+1), and the first pixel PX1 is thereby charged in advance. In an exemplary embodiment, the first pixel PX1 and the second pixel PX2 may be disposed in two neighboring pixel columns. In an alternative exemplary embodiment, the first pixel PX1 and the second pixel PX2 may be disposed in two pixel columns, where at least one pixel column is disposed therebetween.

In the overlap driving described above, the first pixel PX1 receives the data voltage Vd of the second pixel PX2 before a data voltage Vd for the first pixel PX1 is applied thereto and current begins to flow to the first and second decompressing switching elements Qc1 and Qc2 included in the first pixel PX1 before the data voltage Vd for the first pixel PX1 is applied thereto. Accordingly, the voltage of the second sub-pixel electrode 191b may not be changed by a predetermined amount after a predetermined charging time due to the change in the charging amount of the first and second depressing capacitors Cs1 and Cs2, and the effect of visibility improvement may be thereby degraded.

In overlap driving of an exemplary embodiment, two or more decompressing switching elements Qc1 and Qc2 and the decompressing capacitors Cs1 and Cs2 are connected in series instead of connecting only one decompressing switching element and one decompressing capacitor, and the overall operational efficiency of the first and second decompressing switching elements Qc1 and Qc2 during the previous charging time of the overlap driving is thereby substantially degraded and the degrade in visibility due to the change in the charging amount of the first and second decompressing capacitors Cs1 and Cs2 is thereby effectively prevented. Accordingly, the visibility is substantially improved in the overlap driving of an exemplary embodiment. In an exemplary embodiment, the variation in the charging amount of the first and second decompressing capacitors Cs1 and Cs2 may be substantially reduced by a method of reducing a length of at least one channel of the first and second decompressing capacitors Cs1 and Cs2 or increasing a channel width of the at least one of the first and second decompressing switching elements Qc1 and Qc2 for the previous charging time.

In an exemplary embodiment, characteristics of the first and second decompressing switching elements Qc1 and Qc2, the capacity of the first and second decompressing capacitors Cs1 and Cs2, and the number of additional decompressing switching elements and decompressing capacitors may be determined according to the visibility improvement effect.

An alternative exemplary embodiment of the liquid crystal display will now be described with reference to FIG. 5. The same components as the above-mentioned exemplary embodiments are denoted by the same reference numerals and the detailed description thereof will be omitted.

Figure 5:
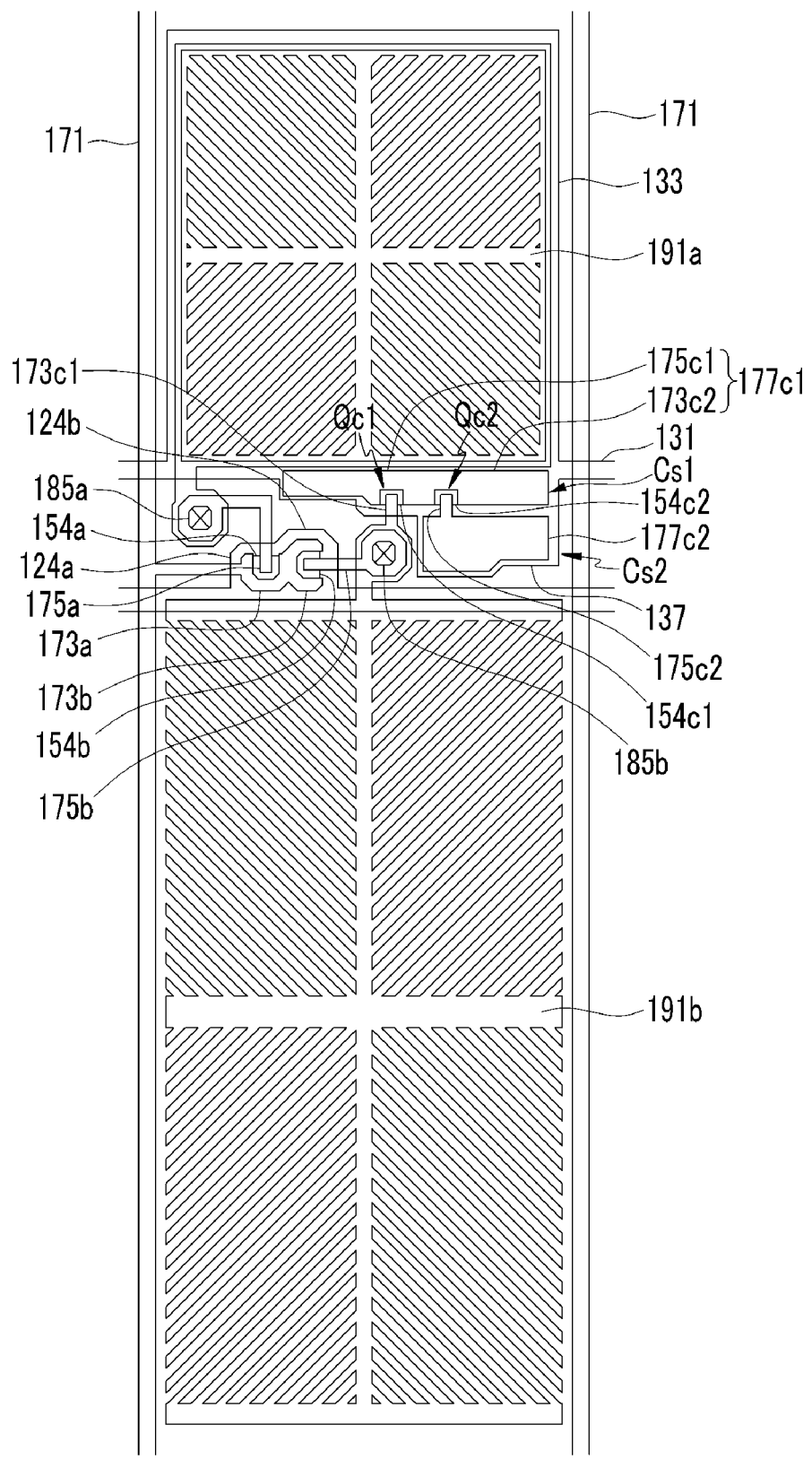
FIG. 5 is a top plan view of one pixel of an alternative exemplary embodiment of a liquid crystal display according to the present invention.

FIG. 5 is a top plan view of one pixel of an alternative exemplary embodiment of a liquid crystal display. The cross-section structure of the liquid crystal display in FIG. 5 is substantially the same as the cross-section structure of the liquid crystal display shown in FIGS. 3 and 4. The same or like elements shown in FIG. 5 have been labeled with the same reference characters as used above to describe the exemplary embodiments of the liquid crystal display shown in FIGS. 3 and 4, and any repetitive detailed description thereof will hereinafter be omitted or simplified.

As described above, an exemplary embodiment of the liquid crystal display includes the lower panel 100, the upper panel 200 disposed opposite to the lower panel 100 and the liquid crystal layer 3 interposed between the lower and upper panels 100 and 200.

The upper panel 200 includes the insulation substrate 210. The opposed electrode 270 is disposed on the insulation substrate 210 and the upper alignment layer (not shown) is disposed on the opposed electrode 270. The upper alignment layer may be a vertical alignment layer.

The liquid crystal layer 3 has the negative dielectric anisotropy and when no electric field is generated in the liquid crystal molecules of the liquid crystal layer 3, the longitudinal axes of the liquid crystal molecules are aligned substantially vertically with respect to the surfaces of the two display panels 100 and 200.

The lower panel 100 includes the insulation substrate 110, and a plurality of gate conductors including the gate line 121 and the common voltage line 131 is disposed on the insulation substrate 110. In an alternative exemplary embodiment, the common voltage line 131 includes the sustain electrode 137 extending downwardly therefrom and a ring portion 133 extending upwardly therefrom and having a closed loop shape.

The gate insulating layer 140 is disposed on the gate conductor, and a plurality of semiconductor stripes (not shown) including the first, second, third and the fourth semiconductors 154a, 154b, 154c1 and 154c2 are disposed on the gate insulating layer. The pairs of ohmic contacts are disposed on the first, second, third and the fourth semiconductors 154a, 154b, 154c1 and 154c2, respectively.

The data conductor, including the data line 171, the first drain electrode 175a, the second drain electrode 175b, the third drain electrode 175c1 and the fourth drain electrode 175c2, is disposed on the ohmic contacts. The data line 171 includes the first source electrode 173a and the second source electrode 173b, and a portion of the third drain electrode 175c1 forms the fourth source electrode 173c2 and includes a wider end 177c2 of the fourth drain electrode 175c2.

The first/second gate electrodes 124a/124b, the first/second source electrodes 173a/173b, and the first/second drain electrodes 175a/175b form the first/second thin film transistors Qa/Qb, that are, the first/second switching elements Qa/Qb, together with the first/second semiconductors 154a/154b. The sustain electrode 137, the third/fourth source electrodes 173c1/173c2 and the third/fourth drain electrodes 175c1/175c2 form the third/fourth thin film transistors Qc1/Qc2, that are, the first/second decompressing switching elements Qc1/Qc2, together with the third/fourth semiconductors 154c1/154c2.

The extension portion 177c1, including the third drain electrode 175c1 and the fourth source electrode 173c2, and the sustain electrode 137 overlapping the extension portion 177c1 form the first decompressing capacitor Cs1 along with the gate insulation layer 140 interposed between the extension portion 177c1 and the sustain electrode 137. The fourth drain electrode 175c2 and the sustain electrode 137 overlapping the fourth drain electrode 175c2 form the second decompressing capacitor Cs2 along with the gate insulation layer 140 interposed between the fourth drain electrode 175c2 and the sustain electrode 137.

The passivation layer 180 is disposed on the data conductor and the opened of the first, second, third and fourth semiconductors 154a, 154b, 154c1, and 154c2, and the passivation layer 180 includes a first contact hole 185a which exposes the wider end of the first drain electrode 175a and the second contact hole 185b which exposes the wider end of the second drain electrode formed thereon.

The pixel electrode including the first subpixel electrode 191a and the second subpixel electrode 191b is disposed on the passivation layer 180. The first subpixel electrode 191a and the second subpixel electrode 191b separated from each other, while the gate line 121 and the common voltage line 131 are interposed therebetween, are disposed on an upper portion and a lower portion of the pixel electrode, respectively. The height of the second subpixel electrode 191b may be greater than the height of the first subpixel electrode 191a. In an exemplary embodiment, the height of the second subpixel electrode 191b may be about 1 to 3 times greater than the height of the first subpixel electrode 191a, but not being limited thereto.

The entire shape of the first subpixel electrode 191a and the second subpixel electrode 191b is quadrangle.

The first subpixel electrode 191a includes a cross-formed stem portion including a horizontal stem portion and a vertical stem portion, an outer portion disposed along an outer portion thereof, and a protruding portion protruded downwardly from the left lower end of the outer portion and connected to the first drain electrode 175a through the first contact hole 185a. In an exemplary embodiment, the ring portion 133 of the common voltage line 131 surrounds the first subpixel electrode 191a, and the light leakage is thereby effectively prevented.

The second subpixel electrode 191b includes a cross-formed stem portion including a horizontal stem portion and a vertical stem portion, an upper horizontal portion and a lower horizontal portion, and a protruding portion protruded up from the upper end of the vertical stem portion of the cross-formed stem portion and connected to the second drain electrode 175b through the second contact hole 185b.

Each of the first subpixel electrode 191a and the second subpixel electrode 191b is divided into four sub-regions defined by the cross stem portion and a plurality of fine branching portions that extends substantially obliquely from the cross-formed stem portion toward the outside is disposed in each of the four sub-regions. In an exemplary embodiment, an angle of each of the plurality of fine branching portions with respect to the gate line 121 may be about 45° or 135°.

Sides of each of the plurality of fine branching portions of the first and second subpixel electrodes 191a and 191b distort electric field generated in the liquid crystal layer by forming a horizontal component substantially vertical to the sides of each of the plurality of fine branching portions, and the inclined direction of the liquid crystal molecules is determined based on the horizontal component. Therefore, the liquid crystal molecules are first inclined in a direction substantially vertical to the sides of each of the plurality of fine branching portions. However, since the direction of the horizontal component of electric field generated by a fine branching portion is opposite to the direction of the horizontal component of electric field generated by a side of a neighboring fine branching portion and the width of the fine branching portion or the interval of the fine branching portion is substantially less than the cell gap of the liquid crystal layer 3, the liquid crystal molecules inclined in a direction opposite to each other are inclined in a direction substantially parallel to a longitudinal direction of the fine branching portion.

In the exemplary embodiment, the first and second subpixel electrodes 191a and 191b include four sub-regions and the fine branching portions disposed in the four sub-regions have four different longitudinal directions. Accordingly, the liquid crystal molecules of the liquid crystal layer 3 are inclined in the four different longitudinal directions. In an exemplary embodiment, as described above, the directions where the liquid crystal molecules are inclined vary, and the reference viewing angle of the liquid crystal display is thereby substantially increased.

In an exemplary embodiment, the first subpixel electrode 191a and the opposed electrode 270 form the first liquid crystal capacitor Clca together with the liquid crystal layer 3 interposed therebetween, and the second subpixel electrode 191b and the opposed electrode 270 form the second liquid crystal capacitor Clcb together with the liquid crystal layer 3 interposed therebetween.

The operation of the liquid crystal display shown in FIG. 5 is substantially the same as the operation of the liquid crystal display shown in FIGS. 3, 4 and 6. Accordingly, in an exemplary embodiment, the charging voltage of the first and second liquid crystal capacitors Clca and Clcb is different, and the side visibility of the liquid crystal display is thereby substantially improved. In addition, an exemplary embodiment of the liquid crystal display shown in FIG. 5 has characteristics and effects substantially similar to the characteristics and effects described above with reference to FIGS. 3, 4 and 6.

According to exemplary embodiments of the present invention as described herein, the visibility of a liquid crystal display is substantially improved while the aperture ratio and transmittance of the liquid crystal display are substantially increased. In addition, the degradation of the visibility is effectively prevented and the stress of the decompressing switching element is substantially reduced in the driving method of previously charging the pixel of the liquid crystal display, and the change in the threshold voltage is thereby substantially decreased.

While the present invention has been particularly shown and described with reference to exemplary embodiments thereof, it will be understood by those of ordinary skill in the art that various changes and modifications in form and details may be made therein without departing from the spirit or scope of the present invention as defined by the following claims.

What is claimed is:

1. A liquid crystal display, comprising:
   a gate line;
   a data line crossing the gate line and insulated from the gate line;
   a common voltage line separated from the gate line and the data line, wherein the common voltage line transfers a predetermined voltage;
   a first switching element connected to the gate line and the data line;
   a second switching element connected to the gate line and the data line;
   a first liquid crystal capacitor connected to the first switching element;
   a second liquid crystal capacitor connected to the second switching element; and
   at least two decompressing switching elements connected to the second switching element and the common voltage line.

2. The liquid crystal display of claim 1, wherein
   the at least two decompressing switching elements are connected to one another in series.

3. The liquid crystal display of claim 2, wherein
   a control terminal of each of the at least two decompressing switching elements is connected to the common voltage line.

4. The liquid crystal display of claim 3, further comprising:
   at least one decompressing capacitor, wherein each of the at least one decompressing capacitor is connected to the common voltage line and at least one decompressing switching element of the at least two decompressing switching elements.

5. The liquid crystal display of claim 4, wherein
   each of the at least one decompressing capacitor includes a first terminal and a second terminal, wherein the first terminal corresponds to an output terminal of a corresponding decompressing switching element of the at least one decompressing switching element connected thereto and the second terminal corresponds to a portion of the common voltage line.

6. The liquid crystal display of claim 5, further comprising:
   a controller which controls a data voltage received from the data line such that a polarity of the data voltage with respect to the predetermined voltage of the common voltage line is inverted every frame.

7. The liquid crystal display of claim 6, wherein
   a control terminal of the first switching element and a control terminal of the second switching element are connected to the gate line,
   an input terminal of the first switching element and an input terminal of the second switching element are connected to the data line,
   an output terminal of the first switching element is connected to the first liquid crystal capacitor, and
   an output terminal of the second switching element is connected to the second liquid crystal capacitor and an input terminal of one decompressing switching element of the at least two decompressing switching elements.

8. The liquid crystal display of claim 7, wherein
   the at least two decompressing switching elements comprise a first decompressing switching element and a second decompressing switching element,
   an input terminal of the first decompressing switching element is connected to the output terminal of the second switching element, and
   an output terminal of the first decompressing switching element and an input terminal of the second decompressing switching element are connected to each other.

9. The liquid crystal display of claim 1, wherein
   a control terminal of each of the at least two decompressing switching elements are connected to the common voltage line.

10. The liquid crystal display of claim 1, further comprising:
    at least one decompressing capacitor, wherein each of the at least one decompressing capacitor is connected to the common voltage line and at least one decompressing switching element of the at least two decompressing switching elements.

11. The liquid crystal display of claim 10, wherein
    each of the at least one decompressing capacitor includes a first terminal and a second terminal, wherein the first terminal corresponds to an output terminal of a corresponding decompressing switching element of the at least one decompressing switching element connected thereto and a second terminal corresponds to a portion of the common voltage line.

12. The liquid crystal display of claim 1, further comprising:
    a controller which controls a data voltage received from the data line such that a polarity of the data voltage with respect to the predetermined voltage of the common voltage line is inverted every frame.

13. The liquid crystal display of claim 1, wherein
    a control terminal of the first switching element and a control terminal of the second switching element are connected to the gate line,
    an input terminal of the first switching element and an input terminal of the second switching element are connected to the data line,
    an output terminal of the first switching element is connected to the first liquid crystal capacitor, and
    an output terminal of the second switching element is connected to the second liquid crystal capacitor and an input terminal of one decompressing switching element of the at least two decompressing switching elements.

14. The liquid crystal display of claim 1, wherein:
    the at least two decompressing switching elements include a first decompressing switching element and a second decompressing switching element, an input terminal of the first decompressing switching element is connected to an output terminal of the second switching element, and an output terminal of the first decompressing switching element and an input terminal of the second decompressing switching element are connected to each other.

15. A liquid crystal display, comprising:

a first substrate;

a second substrate disposed opposite to the first substrate;

a gate line disposed on the first substrate;

a data line disposed on the first substrate;

a common voltage line disposed on the first substrate;

a first switching element connected to the gate line and the data line;

a second switching element connected to the gate line and the data line;

a first subpixel electrode connected to the first switching element;

a second subpixel electrode connected to the second switching element; and at least two decompressing switching elements connected to the second switching element and the common voltage line.

16. The liquid crystal display of claim 15, wherein the at least two decompressing switching elements are connected to one another in series.

17. The liquid crystal display of claim 16, wherein a control terminal of each of the at least two decompressing switching elements is connected to the common voltage line.

18. The liquid crystal display of claim 17, further comprising:

at least one decompressing capacitor, wherein each of the at least one decompressing capacitor is connected to the common voltage line and at least one decompressing switching element of the at least two decompressing switching elements.

19. The liquid crystal display of claim 18, further comprising:

an opposed electrode disposed on the second substrate, wherein the opposed electrode receives a predetermined voltage from the common voltage line.

20. The liquid crystal display of claim 15, wherein a control terminal of each of the at least two decompressing switching elements is connected to the common voltage line.

21. The liquid crystal display of claim 15, further comprising:

at least one decompressing capacitor, wherein each of the at least one decompressing capacitor is connected to the common voltage line and at least one decompressing switching element of the at least two decompressing switching elements.

22. The liquid crystal display of claim 15, further comprising:

an opposed electrode disposed on the second substrate, wherein the opposed electrode receives a predetermined voltage from the common voltage line.

* * * * *